US006984443B2

(12) United States Patent
Kuroki et al.

(10) Patent No.: US 6,984,443 B2
(45) Date of Patent: Jan. 10, 2006

(54) ALIPHATIC POLYESTER RESIN COMPOSITION AND FILMS CONTAINING THE SAME

(75) Inventors: Takayuki Kuroki, Ichihara (JP); Takayuki Watanabe, Ichihara (JP); Yasuhiro Kitahara, Ichihara (JP); Akinori Takehara, Ichihara (JP); Shoji Obuchi, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/380,051

(22) PCT Filed: Jul. 9, 2002

(86) PCT No.: PCT/JP02/06940

§ 371 (c)(1),
(2), (4) Date: Mar. 11, 2003

(87) PCT Pub. No.: WO03/006550

PCT Pub. Date: Jan. 23, 2003

(65) Prior Publication Data

US 2004/0010063 A1 Jan. 15, 2004

(30) Foreign Application Priority Data

Jul. 11, 2001 (JP) ............................ 2001-210247

(51) Int. Cl.
*C08L 67/04* (2006.01)
*C08J 5/18* (2006.01)
*C08K 5/103* (2006.01)

(52) U.S. Cl. ........................ 428/220; 53/396; 428/480; 523/124; 524/306

(58) Field of Classification Search ................ 524/306; 523/124; 428/220, 480; 53/396
See application file for complete search history.

(56) References Cited

U.S. PATENT DOCUMENTS 6,544,607 B1 * 4/2003 Kuroki et al. ............. 428/35.2

FOREIGN PATENT DOCUMENTS

EP 1 029 890 A2 8/2000
JP 2001-106805 A 4/2001

* cited by examiner

*Primary Examiner*—Ana Woodward
(74) *Attorney, Agent, or Firm*—Buchanan Ingersoll PC

(57) ABSTRACT

The invention provides an aliphatic polyester resin composition that contains 100 parts by weight of an aliphatic polyester resin and from 10 to 60 parts by weight of at least one compound of a formula (1):

(1)

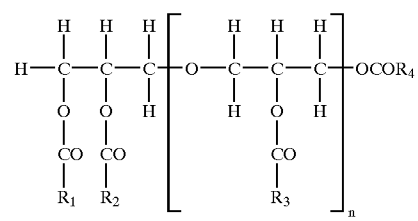

wherein n indicates an integer of from 1 to 9, $R_1$ to $R_4$ each independently represent an alkyl group having from 1 to 17 carbon atoms, and when n is 2 or more, $R_3$ may differ in different units, a film formed of the composition, and packages with the film. The aliphatic polyester film of the invention keeps the degradability in the natural environment that is intrinsic to lactic acid-based polymer, and has good heat resistance, flexibility, transparency and adhesiveness, and, in addition, the plasticizer does not migrate to the surface of the film.

29 Claims, No Drawings

ALIPHATIC POLYESTER RESIN COMPOSITION AND FILMS CONTAINING THE SAME

TECHNICAL FIELD

The present invention relates to an aliphatic polyester resin composition, a film that comprises the resin composition, and packages with the film. Precisely, the invention relates to an aliphatic polyester resin composition which is degradable in the natural environment and contains a specific plasticizer; to an aliphatic polyester film which comprises the resin composition and has good heat resistance, transparency, flexibility and adhesiveness and from which the plasticizer does not migrate to its surface; and to packages with the aliphatic polyester film.

BACKGROUND ART

The problem with plastic wastes is highlighted these days. Plastic wastes such as wrapping materials are, after used by users, discarded and incinerated, or disposed of for land reclamation, etc. However, when such plastic wastes are incinerated, the heat of combustion is high and there occurs a problem in point of the curability of incineration furnaces. Polyvinyl chloride and the like give harmful gas and cause a pollution problem. Further, when they are disposed of for land reclamation, the shaped plastics do not degrade and semi-permanently remain as refuse that has the original shape, and their influence on the natural environment is problematic. Given that situation, various biodegradable plastics that are completely consumed by microorganisms in the natural environment to degrade into natural side products of carbon dioxide and water have been invented and have now amounted to the level of practical use.

For such biodegradable plastics, known is a composition of polylactic acid or thermoplastic polymer that comprises, as the essential ingredients, lactic acid and any other hydroxycarboxylic acid. For example, it is known that they have high mechanical strength and can be worked into containers and films of practical durability. However, the polymer has a high modulus of elasticity and has high toughness, but its flexibility is low. Therefore, it is unsuitable to applications of soft film of polyethylene, polypropylene, polyvinyl chloride, etc.

For softening resin, generally known is a method of adding plasticizer to it. Studies of using various types of plasticizer for softening resin have heretofore been made. For example, JP-A2000-302956 (EP1029890A) describes an aliphatic polyester composition that comprises an aliphatic polyester and, as a plasticizer, at least one compound selected from compounds (A) of the following formula:

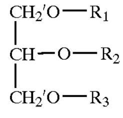

wherein at least one of $R_1$, $R_2$ and $R_3$ is an acyl group having from 6 to 18 carbon atoms, and the remainder is a hydrogen atom or an acetyl group, and compounds (B) of a reaction product of a condensate of from 2 to 10 molecules of glycerin with a carboxylic acid having from 6 to 18 carbon atoms.

This document says that specific examples of the compounds (A) include glycerin diacetomonocaprylate, glycerin diacetomonolaurate and glycerin diacetomonooleate, and the compounds (B) are obtained through reaction of one mol of a glycerin condensate with from 0.8 to 1.2 mols of a carboxylic acid having from 6 to 18 carbon atoms, and their specific examples include tetraglycerin monocaprylate, decaglycerin monolaurate and decaglycerin oleate.

This document further says that the aliphatic polyester film obtained from the composition has excellent heat resistance and flexibility and no plasticizer migration of the film.

The film that comprises the compounds serving as plasticizer has excellent heat resistance and flexibility and no plasticizer migration of the film, but a film having high adhesion force to objects such as glass containers wrapped with it is desired.

DISCLOSURE OF THE INVENTION

Accordingly, the subject matter of the invention is to provide an aliphatic polyester resin composition which is degradable in the natural environment and contains a specific plasticizer; an aliphatic polyester film which comprises the resin composition and has good heat resistance, transparency, flexibility and adhesiveness and from which the plasticizer does not migrate to its surface; and packages with the aliphatic polyester film.

We, the present inventors have assiduously studied to solve the problems noted above, and, as a result, have found that, in an aliphatic polyester film formed of a resin composition that contains an aliphatic polyester resin and, as a plasticizer, a compound of a formula (1):

(1)

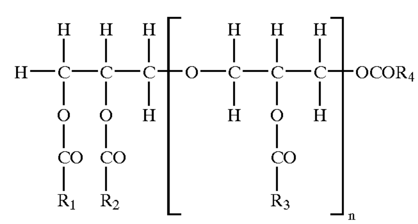

wherein n indicates an integer of from 1 to 9, $R_1$ to $R_4$ each independently represent an alkyl group having from 1 to 17 carbon atoms, and when n is 2 or more, $R_3$ may differ in different units, the plasticizer does not migrate, and the film has good transparency, heat resistance, flexibility and adhesiveness. On the basis of these findings, we have reached the present invention.

Specifically, the invention is characterized by the following [1] to [10]:

[1] An aliphatic polyester resin composition comprising 100 parts by weight of an aliphatic polyester resin and from 10 to 60 parts by weight of at least one compound of a formula (1):

(1)

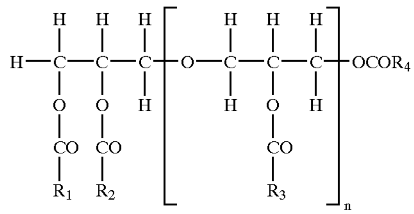

wherein n indicates an integer of from 1 to 9, $R_1$ to $R_4$ each independently represent an alkyl group having from 1 to 17 carbon atoms, and when n is 2 or more, $R_3$ may differ in different units.

[2] An aliphatic polyester film having at least one layer of a film of the aliphatic polyester resin composition according to above [1].

[3] The aliphatic polyester film according to above [2], of which a storage modulus (E') at 20° C. is from $1\times10^7$ to $2\times10^9$ Pa, and a loss tangent (tan δ) indicating the ratio of a loss Young's modulus (E") to the storage modulus (E'), (E"/E') is from 0.1 to 1.0.

[4] The aliphatic polyester film according to above [2] or [3], wherein the aliphatic polyester resin is at least one polyester selected from polylactic acid, and a copolymer of lactic acid with any other aliphatic hydroxycarboxylic acid.

[5] The aliphatic polyester film according to any one of [2] to [4], of which the haze is from 0.05 to 3% when its thickness is 10 μm.

[6] The aliphatic polyester film according to any one of [2] to [4], of which the heat-resistant temperature falls between 100 and 170° C.

[7] The aliphatic polyester film according to any one of [2] to [4], of which the degree of crystallinity is from 10 to 60%.

[8] The aliphatic polyester film according to any one of [2] to [4], of which the thickness is from 5 to 1000 μm.

[9] The aliphatic polyester film according to any one of [2] to [4], which is for wrapping or packaging.

[10] A package of an object wrapped or packaged with the aliphatic polyester film according to any one of [2] to [4].

In the invention, the storage modulus (E'), and the loss tangent (tan δ) that indicates the ratio of loss Young's modulus (E") to storage modulus (E'), (E"/E') are meant to indicate the values measured according to the method mentioned below.

Using a dynamic solid viscoelastometer (Rheometric's Model RSAII), a film sample having a length of 40 mm (MD direction), a width of 5 mm (TD direction) and a mean thickness of from 5 to 15 μm is measured at a temperature falling between −100 and 230° C., at a heating rate of 5° C./min and at a frequency of 1 Hz. The storage modulus (E') at 20° C. of the sample is read, and the value tan δ that indicates the ratio of the loss Young's modulus (E") to the storage modulus (E'), (E"/E') is calculated.

BEST MODES OF CARRYING OUT THE INVENTION

The invention is described in detail hereinunder.

The aliphatic polyester resin composition of the invention is produced by adding, as a plasticizer, at least one compound of formula (1) described above to an aliphatic polyester resin followed by mixing them.

The aliphatic polyester resin for use in the invention contains at least 40 mol %, preferably at least 50 mol %, more preferably at least 60 mol % of lactic acid units in the molecule. Concretely, it includes (1) polylactic acid, and copolymer of lactic acid with any other aliphatic hydroxycarboxylic acid, (2) aliphatic polyesters comprising polyfunctional polysaccharides and lactic acid units, (3) aliphatic polyesters comprising aliphatic polyvalent carboxylic acid units, aliphatic polyvalent alcohol units and lactic acid units, and (4) their mixtures. These are hereinafter referred to as lactic acid-based polymer, a generic term for them. Of those, preferred are polylactic acid and copolymer of lactic acid with any other aliphatic hydroxycarboxylic acid in view of the transparency and the hydrolyzability of the films to be obtained from them.

Lactic acid includes L-lactic acid and D-lactic acid. Unless otherwise specifically indicated, lactic acid simply referred to in the invention indicates both L-lactic acid and D-lactic acid. Also unless otherwise specifically indicated, the molecular weight of polymer indicates a weight-average molecular weight thereof. The polylactic acid for use in the invention includes poly(L-lactic acid) of which the constitutive units are of L-lactic acid alone, poly(D-lactic acid) of which the constitutive units are of D-lactic acid alone, and poly(DL-lactic acid) that comprises L-lactic acid units and D-lactic acid units in a varying ratio. In the copolymer of lactic acid with any other aliphatic hydroxycarboxylic acid, the other aliphatic hydroxycarboxylic acid includes glycolic acid, 3-hydroxybutyric acid, 4-hydroxybutyric acid, 4-hydroxyvaleric acid, 5-hydroxyvaleric acid, 6-hydroxycaproic acid, etc.

For producing the polylactic acid for use in the invention, employable is any of a method of direct dehydrating condensation of L-lactic acid, D-lactic acid, or DL-lactic acid, or a method of ring opening polymerization of a cyclic dimer, lactide, of any of these lactic acids. The ring opening polymerization may be carried out in the presence of a hydroxyl group-having compound of higher alcohols, hydroxycarboxylic acids, etc. For producing the copolymer of lactic acid with any other aliphatic hydroxycarboxylic acid, employable is any of a method of dehydrating polycondensation of any of the above-mentioned lactic acids with any of the above-mentioned aliphatic hydroxycarboxylic acids, or a method of ring opening copolymerization of a cyclic dimer, lactide, of any of the above-mentioned lactic acids with a cyclic derivative of the above-mentioned hydroxycarboxylic acids.

The polyfunctional polysaccharides to be used for producing the aliphatic polyesters comprising polyfunctional polysaccharides and lactic acid units include, for example, cellulose, cellulosenitrate, methyl cellulose, ethyl cellulose, celluloid, viscose rayon, regenerated cellulose, cellophane, cupra, copper ammonia rayon, cuprophane, Bemberg, hemicellulose, starch, achropectin, dextrin, dextran, glycogen, pectin, chitin, chitosan, arabic gum, guar gum, locust bean gum, acacia gum, and their mixtures and their derivatives. Of those, especially preferred are cellulose acetate and ethyl cellulose.

For producing the aliphatic polyester resin that contains polyfunctional polysaccharides and lactic acid units, employable is any of a method of reacting the above-mentioned polyfunctional polysaccharides with the above-mentioned polylactic acid or copolymer of lactic acid with any other aliphatic hydroxycarboxylic acid, or a method of reacting the above-mentioned polyfunctional polysaccharides with any of the above-mentioned lactic acids, cyclic esters, etc.

The aliphatic polycarboxylic acid to be used for producing the aliphatic polyesters comprising aliphatic polyvalent carboxylic acid units, aliphatic polyalcohol units and lactic acid units includes, for example, oxalic acid, succinic acid, malonic acid, glutaric acid, adipic acid, pimelic acid, suberic acid, azelaicacid, undecane-diacid, dodecane-diacid, and their anhydrides. Their mixtures may also be used. The aliphatic polyvalent alcohol includes, for example, ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, tetramethylene glycol, 1,4-cyclohexanedimethanol, etc.

For producing the aliphatic polyesters comprising aliphatic polyvalent carboxylic acid units, aliphatic polyvalent alcohol units and lactic acid units, employable is any of a method of reacting the above-mentioned aliphatic polyvalent carboxylic acid and the above-mentioned aliphatic polyvalent alcohol with the above-mentioned polylactic acid or copolymer of lactic acid with any other aliphatic hydroxycarboxylic acid, or a method of reacting the above-mentioned aliphatic polyvalent carboxylic acid and the above-mentioned aliphatic polyalcohol with any of the above-mentioned lactic acids, cyclic esters, etc.

The molecular weight of the aliphatic polyester resin in the invention has some influence on the workability, the strength and the degradability of the films to be formed of the resin. Resin having a low molecular weight forms films of low strength, and the films will be broken when put under tension while in use. In addition, the films rapidly degrade. On the contrary, resin having a high molecular weight is poorly workable and it is difficult to form the resin into films. Taking these points into consideration, the molecular weight of the aliphatic polyester resin for use in the invention preferably falls between about 10,000 and about 1,000,000, more preferably between about 100,000 and about 300,000.

In the invention, at least one compound of formula (1) is used as the plasticizer for the aliphatic polyester resin. The compounds of formula (1) are obtained by acylating (esterifying) all the hydroxyl groups in a glycerin condensate with an acylating agent in an ordinary manner, for which the amount of the acylating agent to be used is over the amount that corresponds to the number of the hydroxyl groups. Thus obtained according to the method, the hydroxyl value of the acylated product of the glycerin condensate is at most 20, preferably at most 5. The glycerin condensate to be used in producing the compounds of formula (1) is a condensate of from 2 to 10 molecules of glycerin, including diglycerin, triglycerin, tetraglycerin, decaglycerin, etc. The acylating agent includes acetic anhydride, carboxylic acid chlorides having from 1 to 18 carbon atoms, etc.

The value n in formula (1) has some influence on the compatibility of the compounds with resin and on the flexibility of the films to be formed of the resin composition. If n is too large, the compatibility of the compounds with resin is not good, and, in addition, the modulus of elasticity of the films formed increases and the flexibility of the films lowers. The number of carbon atoms to constitute the alkyl group for $R_1$ to $R_4$ has some influence on the flexibility of the films formed. If the number of carbon atoms to constitute the alkyl group is too large, the modulus of elasticity of the films formed increases and the flexibility of the films lowers. From these viewpoints, n in formula (1) is an integer of from 1 to 9, preferably from 1 to 5. $R_1$ to $R_4$ each are an alkyl group having from 1 to 17 carbon atoms, preferably from 1 to 5 carbon atoms. In case where n and $R_1$ to $R_4$ each fall within the range, the compounds of formula (1) are well compatible with the aliphatic polyester resin for use in the invention and give a uniform resin composition, and the films formed of the composition are highly flexible.

$R_1$ to $R_4$ may be the same alkyl group or may be different alkyl groups. In addition, $R_3$ may differ in different glycerin units. Concretely, the compounds are tetraacetyldiglycerin, tetraoctanoyldiglycerin, pentastearoyltriglycerin, etc.

The amount of the plasticizer to be in the resin composition has some influence on the degree of crystallinity, the flexibility, the heat resistance and the adhesiveness of the films formed of the resin composition. If the amount of the plasticizer therein is too large, the degree of crystallinity and the heat resistance of the films decrease; but if too small, the films may not be very flexible. From these viewpoints, the amount of the plasticizer, compound of formula (1) to be in the resin composition is from 10 to 60 parts by weight, preferably from 15 to 50 parts by weight relative to 100 parts by weight of the aliphatic polyester resin therein. When the amount of the plasticizer falls within the range, the films formed of the resin composition have a suitable degree of crystallinity and have good flexibility and heat resistance, and, in addition, their self-adhesiveness and adhesiveness to objects to be wrapped with them are both good.

Not detracting from its properties, the resin composition of the invention may contain any other plasticizer. For example, a compound obtained through reaction of one mol of a condensate of from 2 to 10 molecules of glycerin with from 0.8 to 1.2 mols of an aliphatic carboxylic acid having from 6 to 18 carbon atoms may be added to and mixed with the resin composition. Concretely, the compound includes tetraglycerin monocaprylate, tetraglycerin monostearate, tetraglycerin monooleate, hexaglycerin monolaurate, hexaglycerin monooleate, decaglycerin monopropionate, decaglycerin monolaurate, decaglycerin monobehenate, decaglycerin monostearate, decaglycerin monooleate, etc. Typical commercial products of the compounds are Riken Vitamin's trade name, Poem J-0381 (decaglycerin monooleate, hydroxyl value 529), its trade name, Poem J-0021 (decaglycerin monolaurate, hydroxyl value 615), its trade name, Poem J-4581 (tetraglycerin monooleate, hydroxyl value 250), etc. The amount of the additional plasticizer that may be in the resin composition is at most 20 parts by weight relative to 100 parts by weight of the compound of formula (1) therein.

Not interfering with the object of the invention, any other additives than the compounds of formula (1) may also be added to the aliphatic polyester resin composition of the invention, depending on the use of the composition. The additives include antiblocking agents such as silica, calcium carbonate, titania, mica, talc; lubricants, for example, hydrocarbons such as liquid paraffin, polyethylene wax, aliphatic acids such as stearic acid, hydroxy-fatty acids, fatty acid amides, alkylenebis-fatty acid amides, lower alcohol esters of fatty acids, polyvalent alcohol esters of fatty acids, polyglycol esters of fatty acids, aliphatic alcohols, polyvalent alcohols, polyglycols, metal soap such as calcium stearate; antistatic agents such as salts of fatty acids, sulfate esters of higher alcohols, salts of sulfate esters of liquid fatty oils, sulfate salts of aliphatic amines and aliphatic amides, salts of phosphate esters of aliphatic alcohols, sulfonate salts of dibasic fatty acid esters, sulfonate salts of aliphatic amides, alkyl allyl sulfonate salts, aliphatic amine salts, quaternary ammonium salts, alkylpyridinium salts, polyoxyethylene alkyl ethers, polyoxyethylene alkylphenol ethers, polyoxyethylene alkyl esters, sorbitan alkyl esters, polyoxyethylene sorbitan alkyl esters, imidazoline derivatives, higher alkylamines; antifoggants, for example, glycerin fatty acid esters such as glycerin monostearate, sorbitan fatty acid esters such as sorbitan monolaurate, sorbitan monooleate, as well as polyglycerin fatty acid esters, propylene glycol fatty acid esters; UV absorbents, for example, benzotriazoles such as 2-(2'-hydroxy-5'-methylphenyl)benzotriazole, benzophenones such as 2-hydroxy-4-methoxybenzophenone, salicylic acid derivatives such as p-tert-butylphenyl salicylate; thermal stabilizers, for example, phenolic compounds such as paramethoxyphenol, phosphite compounds such as triphenyl phosphite, sulfur-containing compounds such as 2-mercaptobenzimidazole, amine compounds such as phenylnaphthylamine; antioxidants; discoloration inhibitors; fillers and pigments such as barium sulfate, titanium oxide, kaolin, carbon black; and flame retardants, for example, halogen compounds such as decabromodiphenyl ether, antimony compounds such as antimony trioxide.

For adding the plasticizer of formula (1) to aliphatic polyester resin and mixing them in the invention, employable is a method of uniformly mixing the aliphatic polyester resin, the plasticizer and optionally any other additives by the use of a high-speed or low-speed stirrer or the like, followed by melt-kneading the resulting mixture in a high-performance single-screw or multi-screw extruder, etc. In general, the resin composition of the invention is preferably in the form of pellets, rods, powder, etc.

Next, the aliphatic polyester film of the invention and one example of a method for producing it are described below.

The resin composition of the invention is melt-extruded into a film, through an extruder equipped with a T-die. Preferably, the thus-obtained film is stretched with rolls in the flow direction (machine direction—hereinafter referred to as MD direction), and then stretched with a tenter in the transverse direction (in the direction perpendicular to the machine direction—hereinafter referred to as TD direction). The order of the stretching operations may be opposite to the above. After thus stretched, the film is then heat-set under tension to be an oriented polyester film. For mono-axial orientation, the film may be stretched in any of MD or TD direction.

The melt-extrusion temperature for the aliphatic polyester resin composition that contains various additives as above preferably falls between 100 and 280° C., more preferably between 130 and 250° C. If the molding temperature is too low, the molding stability will be poor and the films being molded will be under overload. Contrary to this, if the molding temperature is too high, the aliphatic polyester may decompose and it is unfavorable since the molecular weight of the polyester lowers, the strength of the films may lower and the films may discolor.

Preferably, the aliphatic polyester film of the invention is at least uniaxially stretched by 1.5 to 5 times in any of MD or TD direction. More preferably, it is biaxially stretched in both MD and TD directions, and it is a biaxially-oriented film. In producing such oriented films, if the draw ratio is smaller than 1.5 times, the degree of crystallinity could not increase in the oriented films and the films could not enjoy the stability with time of mechanical properties and dimensional accuracy. On the other hand, if the draw ratio is larger than 5 times, it is unfavorable since the films will lose the flexibility and will be broken while stretched. Preferably, the stretching temperature falls between the glass transition temperature (Tg) of the aliphatic polyester resin to form the films and (Tg+50)° C., more preferably between Tg and (Tg+30)° C. At a temperature lower than Tg, the films are difficult to stretch; but at a temperature higher than (Tg+50)° C., the films could not be uniformly stretched and are therefore unfavorable. For improving the heat resistance and the dimensional stability thereof, the stretched films are heat-set under tension at a temperature not lower than (Tg+10)° C. but lower than the melting point thereof. Varying the condition for stretching and heat-setting in this stage, the degree of crystallinity of the processed films may be controlled.

Stretched and heat-set under the condition mentioned above, the films are oriented to have a degree of crystallinity of from 10 to 60%. Preferably, the degree of crystallinity of the oriented films is from 20 to 50%. For example, 20 parts by weight of a compound of formula (1) where $R_1$ to $R_4$ are all alkyl groups having one carbon atom and n is 1 is added to 100 parts by weight of a lactic acid-based polymer, the resulting mixture is sheeted through a T-die into a film, and the film is then stretched at 50° C. by 2.5 times in the MD direction and by 2.5 times in the TD direction (this stretching mode is hereinafter abbreviatedas 2.5×2.5). Next, this is heat-set at 140° C. under tension, and it gives an oriented film having a degree of crystallinity of about 30%.

The aliphatic polyester film of the invention may be produced in any form of rolls, tapes, cut sheets or (seamless) cylinders by suitably determining the process condition in accordance with the intended object.

The aliphatic polyester film of the invention is favorable to shopping bags, garbage bags, compost bags, films for packaging foods and confectionery, films for wrapping foods, films for wrapping cosmetics and perfumes, films for wrapping medicines, films for wrapping herbs, films for wrapping surgical poultices for stiff shoulders, sprain, etc., films for agricultural and horticultural use, films for wrapping agricultural chemicals, films for greenhouses, fertilizer bags, films for packaging video or audio magnetic tape cassette products, films for packaging flexible discs, films for plate making, adhesive tapes, waterproof sheets, sandbags, etc. Of those applications, the film of the invention is more favorable for packaging, and it forms packages. The objects to be packaged with the film are foods such as vegetables, fruits, confectionery; cosmetics, medicines, agricultural chemicals, fertilizer, soil, domestic garbage, compost; electric and electronic products such as videos, CDs, MOs, MDs, DVDs, etc. The thickness of the polyester film of the invention may vary in accordance with the use thereof, and it is generally from 5 to 1000 $\mu$m.

The aliphatic polyester film of the invention maybe formed into bags in various methods of heat sealing, high frequency sealing, fusing or the like. For example, a film produced in the form of cut sheets is folded in two, and the two sides running from the folded edge are heat-sealed with a heat-sealing bar at a temperature not lower than Tg (glass transition temperature) of the film to form a bag. A rolled film, while unrolled, is folded in two in the TD direction, and it is fused at regular intervals in the MD direction with a fusing bar at a temperature not lower than the melting point of the film to form bags. A cylindrical rolled film, while unrolled, is heat-sealed at predetermined regular intervals in the MD direction with a heat-sealing bar at a temperature not lower than Tg, and the part just adjacent to the heat-sealed part is cut at predetermined regular intervals in the MD direction to form bags.

If desired, the aliphatic polyester film of the invention may be coated with a layer having a function of antistatic property, fogging resistance, stickiness, gas barrier capability, airtight adhesiveness, easy adhesiveness or the like. For example, an aqueous coating liquid that contains an antistatic agent may be applied to one or both surfaces of the film and dried to form an antistatic layer thereon. For applying such an aqueous coating liquid, employable is any known method. Concretely, employable for it is any of doctor-blade coating, spraying, air-knife coating, reverse coating, kiss coating, gravure coating, Meyer's bar coating, roll brushing or the like.

An acrylic resin adhesive, for example, a copolymer prepared through copolymerization of an essential ingredient such as ethyl acrylate, butyl acrylate or 2-ethylhexyl acrylate with any other vinylic monomer is uniformly dissolved in an organic solvent to prepare a solvent-based coating liquid, or it is granularly dispersed in water to prepare an aqueous emulsion-based coating liquid. Thus prepared, the coating liquid is applied to the film and dried thereon in a known method to thereby make the film adhesive.

Also if desired, the aliphatic polyester film of the invention may be laminated with any other resin or film so as to be coated with the layer thereof having a function of static charge prevention, fogging resistance, stickiness, gas barrier capability, airtight adhesiveness, easy adhesiveness or the like. For this, employable is any known method of extrusion lamination, dry lamination or the like.

The storage modulus (E') at 20° C. of the aliphatic polyester film of the invention is from $1\times10^7$ to $2\times10^9$ Pa, and the film is highly flexible. In addition, the loss tangent (tan δ) at 20° C. of the film is from 0.1 to 1.0; and the adhesion power of the film, measured according to the method described in the section of Examples mentioned below, is at least 200 g/cm$^2$. This means that the film has good self-adhesiveness and adhesiveness to objects to be wrapped with it. Further, the haze of the film is from 0.05 to 3%; the heat-resistant temperature thereof is from 100 to 170° C.; and the degree of crystallinity thereof is from 10 to 60%. The characteristics of the uniaxially oriented aliphatic polyester film that is produced by at least uniaxially stretching the aliphatic polyester film of the invention are almost the same as above.

EXAMPLES

The invention is described in more detail with reference to the following Examples. The degree of crystallinity, the storage modulus, tan δ, the haze, the heat resistant temperature, the adhesiveness and the degree of migration referred to in the Examples are measured according to the methods mentioned below.

(1) Degree of Crystallinity (%)

Using a differential scanning calorimeter (Rigaku's Model TAS100), a melting curve of a sample is drawn. From the peak area of the melting curve, the heat of fusion (ΔH) of the sample is obtained. Based on the heat of fusion ($\Delta H_0$) of complete crystal, the degree of crystallinity (Xc) of the sample is calculated according to the following numerical equation. The standard substance used is indium.

$$Xc=\Delta H/\Delta H_0$$

(2) Storage Modulus E' ($P_a$), tan δ:

Using a dynamic solid viscoelastometer (Rheometric's Model RSAII), a film sample having a length of 40 mm (MD direction), a width of 5 mm (TD direction) and a mean thickness of from 5 to 15 μm is measured at a temperature falling between −100 and 230° C., at a heating rate of 5° C./min and at a frequency of 1 Hz. The storage modulus (E') at 20° C. of the sample is read, and the value tan δ that indicates the ratio of the loss Young's modulus (E") to the storage modulus (E'), (E"/E') is calculated.

(3) Haze (%):

Using a haze meter (by Tokyo Denshoku), the haze value (%) of a film sample is obtained, and this is converted into a value of the corresponding film sample having a thickness of 10 μm.

(4) Heat-resistant Temperature (° C.)

A film sample of 14 cm (MD)×3 cm (TD) is attached to a sheet of flat-grain paper having the same width as that of the film, and the flat-grain paper and the film are stuck and fixed to each other at the two edges of 2.5 cm length in the MD direction. This is a sample to be tested herein. Of the two edges of 2.5 cm length each, the upper edge of the film sample thus reinforced with the flat-grain paper is fixed to a tool to the full width thereof, and a weight of 10 g is fitted to the center of the lower edge of the film sample. In that condition, the film sample is rapidly put into an air oven that has been conditioned at a predetermined temperature, and heated therein for 1 hour. The sample is checked as to whether or not it is cut. The test temperature is elevated at regular intervals of 5° C. After one hour, when the sample is not cut, the temperature is further elevated by 5° C. and the same operation as previously is repeated. The maximum temperature at which the sample is not cut is read, and this is the heat-resistant temperature of the sample tested.

(5) Adhesion Power:

A film sample of 10 cm (MD)×5 cm (TD) is put on a glass sheet (surface roughness Ra=0.7 to 1.5 nm; 150 mm×150 mm×3.0 mm thickness) so that the contact area may be 50 mm×50 mm. An aluminum plate of 50 mm×50 mm×1 mm thickness is put over the film, and a weight is further put thereon so that the load to the film may be 4 KPa. After 10 seconds, the aluminum plate and the weight are removed. The MD edges of the film are held by the clips fitted to the tips of a push-pull gauge (Aiko Engineering's Push-Pull Gauge 9505A). In that condition, the film is pulled at a rate of 200 mm/min by operating the push-pull gauge, and the adhesion power (shear peeling power) of the film is measured. One sample is measured 5 times, and the maximum and minimum data are cut. The remaining three data are averaged, and the resulting average indicates the adhesion power of the sample.

(6) Migration:

A film sample of 10 cm (MD)×10 cm (TD) is left in an atmosphere at 60° C. and 50% RH, and visually checked for the presence or absence of the plasticizer that has migrated out on the film surface. Based on the time (days) taken before migration of the plasticizer, the sample is evaluated as follows. ◎: 60 days or more, ○: 30 days or more but less than 60 days, Δ: 14 days or more but less than 30 days, x: less than 14 days.

Production Example 1

<Production of Aliphatic Polyester Resin>

In a 100-liter reactor equipped with a Dien-Stark trap, 10 kg of 90 mol % L-lactic acid (impurity content, 0.5 mol %) was heated at 150° C. under 7000 Pa for 3 hours with stirring while water was evaporated away, and then 6.2 g of tin powder was added thereto and further stirred at 150° C. and under 4000 Pa for 2 hours for oligomerization. To the oligomer, added were 28.8 g of tin powder and 21.1 kg of diphenyl ether and reacted at 150° C. and under 4700 Pa for azeotropic dehydration. The evaporated water and solvent were separated in a water separator, and the aqueous layer was successively drawn out and the solvent only was returned to the reactor. After 2 hours (in this stage, the impurity content was 0.05 mol %), the organic solvent to be returned to the reactor was passed through a column filled with 4.6 kg of Molecular Sieve 3A before being returned to the reactor. In that condition, the reaction was effected at 150° C. and under 4700 Pa to obtain a solution of polylactic acid having a polystyrene-based weight-average molecular weight of 120,000. The solution was diluted with 44 kg of dewatered diphenyl ether added thereto, and then cooled to 40° C., and the deposited crystal was taken out through filtration. This was washed three times with 10 kg of n-hexane, and then dried at 60° C. and under 7000 Pa. The resulting powder was stirred along with 12 kg of 0.5 N hydrochloric acid and 12 kg of ethanol added thereto, at 35° C. for 1 hour, and then taken out through filtration. Dried at 60° C. and under 7000 Pa, 6.1 kg (yield, 85% by weight) of polylactic acid powder having a mean particle size of 30 $\mu$m was obtained. The polystyrene-based weight-average molecular weight of the polymer was about 120,000.

Production Example 2

<Production of Compound A1 (Tetraacetyldiglycerin)>

84 g of diglycerin and 415 g of acetic anhydride were put into a reaction flask, to which was added 2.5 g of strong acid ion-exchange resin (Dow Chemical's trade name, Dowex MSC-1). With stirring, this was reacted at 80 to 90° C. for 1 hour. After cooled, the ion-exchange resin was removed through filtration, and the formed acetic acid and the non-reacted acetic anhydride were evaporated away under reduced pressure. This gave 161.5 g of tetraacetyldiglycerin (hereinafter referred to as Compound A1). Compound A1 is represented by formula (1) where $R_1$ to $R_4$ are all alkyl groups having one carbon atom and n is 1. Its acid value is 0.2, and its hydroxyl value is 3.1.

Production Example 3

<Production of Compound A2 (Tetraoctanoyldiglycerin)>

500 g of chloroform, 42 g of diglycerin and 195 g of octanoic acid chloride were put into a reaction flask, to which was dropwise added 95 g of pyridine at 20 to 30° C. Next, this was stirred at 40° C. for 2 hours to react the compounds. After the reaction, the reaction liquid was washed with water, chloroform was evaporated away, and 160 g of tetraoctanoyldiglycerin (hereinafter referred to as Compound A2) was obtained. Compound A2 is represented by formula (1) where $R_1$ to $R_4$ are all alkyl groups having 7 carbon atoms and n is 1. Its acid value is 0.5, and its hydroxyl value is 4.5.

Production Example 4

<Production of Compound A3 (Pentastearoyltriglycerin)>

500 g of chloroform, 24 g of triglycerin and 167 g of stearic acid chloride were put into a reaction flask, to which was dropwise added 43 g of pyridine at 20 to 30° C. Next, this was stirred at 40° C. for 2 hours to react the compounds. Then, this was processed in the same manner as in Production Example 3, and 142 g of pentastearoyltriglycerin (hereinafter referred to as Compound A3) was obtained. Compound A3 is represented by formula (1) where $R_1$ to $R_4$ are all alkyl groups having 17 carbon atoms and n is 2. Its acid value is 0.4, and its hydroxyl value is 2.9.

Production Example 5

<Production of Compound A4 (Dodecabehenoyldecaglycerin)>

500 g of chloroform, 19 g of decaglycerin and 108 g of behenic acid chloride were put into a reaction flask, to which was dropwise added 26 g of pyridine at 20 to 30° C. Next, this was stirred at 40° C. for 2 hours to react the compounds. Then, this was processed in the same manner as in Production Example 3, and 110 g of dodecabehenoyldecaglycerin (hereinafter referred to as Compound A4) was obtained. Compound A4 is represented by formula (1) where $R_1$ to $R_4$ are all alkyl groups having 21 carbon atoms and n is 9. Its acid value is 0.3, and its hydroxyl value is 2.1.

Example 1

Using an extruder equipped with a T-die, pellets containing 100 parts by weight of the polymer obtained in Production Example 1, 30 parts by weight of Compound A1 and 5 parts by weight of decaglycerin oleate (Riken Vitamin's trade name, Poem J-0381—this is hereinafter referred to as Compound B1) were melt-kneaded and extruded out at 180° C. to give a non-oriented film having a thickness of 80 $\mu$m. The non-oriented film was stretched by 2.5 times in the MD direction and then by 3 times in the TD direction, and thereafter this was heat-set at 130° C. Then, this was cooled with air at 30° C. to obtain an oriented film having a mean thickness of 10 $\mu$m. The degree of crystallinity of the thus-obtained film was 15%. The test data of the elastic modulus, tan δ, haze, heat-resistant temperature, adhesion power and migration resistance of the film are given in [Table 1].

Example 2

Using an extruder equipped with a T-die, pellets containing 100 parts by weight of the polymer obtained in Production Example 1 and 25 parts by weight of Compound A1 were melt-kneaded and extruded out at 180° C. to give a non-oriented film having a thickness of 60 $\mu$m. The non-oriented film was stretched by 2 times in the MD direction and then by 2.5 times in the TD direction, and thereafter this was heat-set at 130° C. Then, this was cooled with air at 30° C. to obtain an oriented film having a mean thickness of 10 $\mu$m. The degree of crystallinity of the thus-obtained film was 25%. The test data of the elastic modulus, tan δ, haze, heat-resistant temperature, adhesion power and migration resistance of the film are given in [Table 1].

Example 3

Using an extruder equipped with a T-die, pellets containing 100 parts by weight of the polymer obtained in Production Example 1 and 55 parts by weight of Compound A2 were melt-kneaded and extruded out at 180° C. to give a non-oriented film having a thickness of 50 $\mu$m. The non-oriented film was stretched by 1.5 times in the MD direction and then by 2.5 times in the TD direction, and thereafter this was heat-set at 130° C. Then, this was cooled with air at 30° C. to obtain an oriented film having a mean thickness of 10 $\mu$m. The degree of crystallinity of the thus-obtained film was 12%. The test data of the elastic modulus, tan δ, haze, heat-resistant temperature, adhesion power and migration resistance of the film are given in [Table 1].

Example 4

Using an extruder equipped with a T-die, pellets containing 100 parts by weight of the polymer obtained in Production Example 1 and 30 parts by weight of Compound A3 were melt-kneaded and extruded out at 180° C. to give a non-oriented film having a thickness of 40 μm. A film of the polymer obtained in Production Example 1, having a thickness of 10 μm, was laminated on both surfaces of the non-oriented film, and then this was stretched by 2.5 times in the MD direction and then by 3 times in the TD direction, and thereafter heat-set at 130° C. Then, this was cooled with air at 30° C. to obtain an oriented film having a mean thickness of 10 μm. The test data of the elastic modulus, tan δ, haze, heat-resistant temperature, adhesion power and migration resistance of the film are given in [Table 1].

Example 5

Using an extruder equipped with a T-die, pellets containing 100 parts by weight of the polymer obtained in Production Example 1 and 40 parts by weight of Compound A3 were melt-kneaded and extruded out at 180° C. to give a non-oriented film having a thickness of 60 μm. A film of polybutylene succinate having a thickness of 10 μm was laminated on both surfaces of the non-oriented film, and then the non-oriented film was stretched by 2.5 times in the MD direction and then by 3 times in the TD direction, and thereafter heat-set at 130° C. Then, this was cooled with air at 30° C. to obtain an oriented film having a mean thickness of 10 μm. The test data of the elastic modulus, tan δ, haze, heat-resistant temperature, adhesion power and migration resistance of the film are given in [Table 1].

Example 6

Using a 40-mm inflation molding machine (die diameter, 40 mm), pellets containing 100 parts by weight of the polymer obtained in Production Example 1 and 20 parts by weight of Compound A1 were molded into an inflation film having a flat width of 150 mm and a thickness of 12 μm. Thus obtained, the film was heat-set at 140° C., and then cooled with air at 30° C. The degree of crystallinity of the thus-obtained film was 18%. The test data of the elastic modulus, tan δ, haze, heat-resistant temperature, adhesion power and migration resistance of the film are given in [Table 1].

Comparative Example 1

Using an extruder equipped with a T-die, pellets containing 100 parts by weight of the polymer obtained in Production Example 1 and 5 parts by weight of Compound A1 were melt-kneaded and extruded out at 180° C. to give a non-oriented film having a thickness of 80 μm. The non-oriented film was stretched by 2.5 times in the MD direction and then by 3.0 times in the TD direction, and thereafter this was heat-set at 130° C. Then, this was cooled with air at 30° C. to obtain an oriented film having a mean thickness of 10 μm. The degree of crystallinity of the thus-obtained film was 30%. The test data of the film are given in [Table 2].

Comparative Example 2

Using an extruder equipped with a T-die, pellets containing 100 parts by weight of the polymer obtained in Production Example 1 and 70 parts by weight of Compound A1 were melt-kneaded and extruded out at 180° C. to give a non-oriented film having a thickness of 70 μm. The non-oriented film was stretched by 2 times in the MD direction and then by 3 times in the TD direction, and thereafter this was heat-set at 130° C. Then, this was cooled with air at 30° C. to obtain an oriented film having a mean thickness of 10 μm. The degree of crystallinity of the thus-obtained film was 15%. The test data of the film are given in [Table 2].

Comparative Example 3

Using an extruder equipped with a T-die, pellets containing 100 parts by weight of the polymer obtained in Production Example 1 and 25 parts by weight of Compound A4 were melt-kneaded and extruded out at 180° C. to give a non-oriented film having a thickness of 60 μm. The non-oriented film was stretched by 2 times in the MD direction and then by 2.5 times in the TD direction, and thereafter this was heat-set at 130° C. Then, this was cooled with air at 30° C. to obtain an oriented film having a mean thickness of 10 μm. The degree of crystallinity of the thus-obtained film was 20%. The test data of the film are given in [Table 2].

Comparative Example 4

Using an extruder equipped with a T-die, pellets containing 100 parts by weight of the polymer obtained in Production Example 1 and 15 parts by weight of decaglycerin laurate (Riken Vitamin's trade name, Poem J-0021—this is hereinafter referred to as Compound B2) were melt-kneaded and extruded out at 180° C. to give anon-oriented film having a thickness of 60 μm. The non-oriented film was stretched by 2 times in the MD direction and then by 3 times in the TD direction, and thereafter this was heat-set at 130° C. Then, this was cooled with air at 30° C. to obtain an oriented film having a mean thickness of 10 μm. The degree of crystallinity of the thus-obtained film was 15%. The test data of the film are given in [Table 2].

Comparative Example 5

Using an extruder equipped with a T-die, pellets containing 100 parts by weight of the polymer obtained in Production Example land 50 parts by weight of tetraglycerin oleate (Riken Vitamin's trade name, Poem J-4581—this is hereinafter referred to as Compound B3) were melt-kneaded and extruded out at 180° C. to give a non-oriented film having a thickness of 80 m. The non-oriented film was stretched by 2.5 times in the MD direction and then by 3 times in the TD direction, and thereafter this was heat-set at 130° C. Then, this was cooled with air at 30° C. to obtain an oriented film having a mean thickness of 10 μm. The degree of crystallinity of the thus-obtained film was 15%. The test data of the film are given in [Table 2].

TABLE 1

| | | Example 1 | Example 2 | Example 3 | Example 4 | Example 5 | Example 6 |
|---|---|---|---|---|---|---|---|
| Compound A | type | A1 | A1 | A2 | A3 | A3 | A1 |
| | wt. pts. | 30 | 25 | 55 | 30 | 40 | 20 |
| Compound B | type | B1 | — | — | — | — | — |
| | wt. pts. | 5 | — | — | — | — | — |
| Constitution of Film | | single-layered | single-layered | single-layered | multi-layered | multi-layered | single-layered |
| Draw Ratio (times) | | 2.5 × 3.0 | 2.0 × 2.5 | 1.5 × 2.5 | 2.5 × 3.0 | 2.5 × 3.0 | 1.3 × 3.0 |
| Degree of Crystallinity (%) | | 15 | 25 | 12 | — | — | 18 |
| Elastic Modulus (Pa) | | $1 \times 10^9$ | $6 \times 10^8$ | $6 \times 10^7$ | $5 \times 10^8$ | $6 \times 10^8$ | $1.2 \times 10^8$ |
| tan δ | | 0.4 | 0.5 | 0.6 | 0.5 | 0.4 | 0.5 |
| Haze (%) | | 0.8 | 1 | 0.6 | 0.8 | 2.5 | 0.9 |
| Adhesion Power (g/cm$^2$) | | 220 | 250 | 420 | 280 | 260 | 320 |
| Heat-resistant Temperature (° C.) | | 135 | 140 | 130 | 135 | 140 | 130 |
| Migration Resistance | | ◎ | ◎ | ◎ | ◎ | ◎ | ◎ |

TABLE 2

| | | Comp. Ex. 1 | Comp. Ex. 2 | Comp. Ex. 3 | Comp. Ex. 4 | Comp. Ex. 5 |
|---|---|---|---|---|---|---|
| Compound A | type | A1 | A1 | A4 | — | — |
| | wt. pts. | 5 | 70 | 25 | — | — |
| Compound B | type | — | — | — | B2 | B3 |
| | wt. pts. | — | — | — | 15 | 50 |
| Constitution of Film | | single-layered | single-layered | single-layered | single-layered | single-layered |
| Draw Ratio (times) | | 2.5 × 3.0 | 2.0 × 3.0 | 2.0 × 2.5 | 2.0 × 3.0 | 2.5 × 3.0 |
| Degree of Crystallinity (%) | | 30 | 15 | 20 | 15 | 15 |
| Elastic Modulus (Pa) | | $2.5 \times 10^9$ | $8 \times 10^6$ | $2.4 \times 10^9$ | $8 \times 10^8$ | $1 \times 10^8$ |
| tan δ | | 0.2 | 0.8 | 0.2 | 0.4 | 0.5 |
| Haze (%) | | 0.8 | 0.9 | 1.1 | 0.9 | 0.8 |
| Adhesion Power (g/cm$^2$) | | 100 | 600 | 120 | 150 | 150 |
| Heat-resistant Temperature (° C.) | | 150 | 110 | 140 | 150 | 135 |
| Migration Resistance | | ◎ | x | ◎ | ○ | x |

Example 7

The film obtained in Example 1 was cut into sheets each having a length of 180 mm and a width of 500 mm. Each sheet was folded in two in the TD direction, and the two sides running from the folded edge were heat-sealed at 100° C. The bags thus formed had a width at the opening of about 175 mm and a depth of 250 mm. About 500 g of tomatoes were put into each bag, of which the opening was drawn and fixed with a bonding tape. Tomatoes were thus packaged in each bag.

Example 8

The inflation film obtained in Example 6, which had a flat width of 150 mm and a thickness of 12 μm, was fused at regular intervals of 250 mm in the MD direction, at a fusing temperature of 280° C., and then cut at the fused intervals to give bags each having a width at the opening of 150 mm and a depth of about 245 mm. About 500 g of carrots were put into each bag, of which the opening was drawn and fixed with a bonding tape. Carrots were thus packaged in each bag.

Advantages of the Invention

The aliphatic polyester film obtained from the aliphatic polyester resin composition of the invention keeps the degradability in the natural environment that is intrinsic to lactic acid-based polymer, and has good heat resistance, flexibility, transparency and adhesiveness, and, in addition, the plasticizer does not migrate to the surface of the film. Accordingly, the film is favorably used in a broad range for various industrial materials, for example, for films for wrapping or packaging foods, electronic appliances, medicines, chemicals, cosmetics, etc., for films for agricultural use, for films for civil engineering and construction use, for adhesive tapes, etc. Even when the film is discarded after used, it does not accumulate as industrial wastes or domestic wastes.

What is claimed is:

1. An aliphatic polyester resin composition comprising 100 parts by weight of an aliphatic polyester resin and from 10 to 60 parts by weight of at least one compound having a hydroxyl value of at most 20 of a formula (1):

(1)

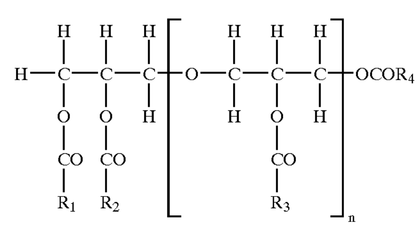

wherein n indicates an integer of from 1 to 9, $R_1$ to $R_4$ each independently represent an alkyl group having from 1 to 17 carbon atoms, and when n is 2 or more, $R_3$ may differ in different units.

2. An aliphatic polyester film having at least one layer of a film of the aliphatic polyester resin composition according to claim 1.

3. The aliphatic polyester film according to claim 2, of which a storage modulus (E') at 20° C. is from $1\times10^7$ to $2\times10^9$ Pa, and a loss tangent (tan δ) indicating the ratio of a loss Young's modulus (E") to the storage modulus (E'), (E"/E') is from 0.1 to 1.0.

4. The aliphatic polyester film according to claim 2, wherein the aliphatic polyester is at least one polyester selected from polylactic acid, and a copolymer of lactic acid with any other aliphatic hydroxycarboxylic acid.

5. The aliphatic polyester film according to claim 2, of which the haze is from 0.05 to 3% when its thickness is 10 μm.

6. The aliphatic polyester film according to claim 2, of which the heat-resistant temperature falls between 100 and 170° C.

7. The aliphatic polyester film according to claim 2, of which the degree of crystallinity is from 10 to 60%.

8. The aliphatic polyester film according to claim 2, of which the thickness is from 5 to 1000 μm.

9. The aliphatic polyester film according to claim 2, which is for wrapping or packaging.

10. A package of an object wrapped or packaged with the aliphatic polyester film according to claim 2.

11. The aliphatic polyester film according to claim 3, wherein the aliphatic polyester is at least one polyester selected from polylactic acid, and a copolymer of lactic acid with any other aliphatic hydroxycarboxylic acid.

12. The aliphatic polyester film according to claim 3, of which the haze is from 0.05 to 3% when its thickness is 10 μm.

13. The aliphatic polyester film according to claim 3, of which the heat-resistant temperature falls between 100 and 170° C.

14. The aliphatic polyester film according to claim 3, of which the degree of crystallinity is from 10 to 60%.

15. The aliphatic polyester film according to claim 3, of which the thickness is from 5 to 1000 μm.

16. The aliphatic polyester film according to claim 3, which is for wrapping or packaging.

17. A package of an object wrapped or packaged with the aliphatic polyester film according to claim 3.

18. The aliphatic polyester film according to claim 11, of which the haze is from 0.05 to 3% when its thickness is 10 μm.

19. The aliphatic polyester film according to claim 11, of which the heat-resistant temperature falls between 100 and 170° C.

20. The aliphatic polyester film according to claim 11, of which the degree of crystallinity is from 10 to 60%.

21. The aliphatic polyester film according to claim 11, of which the thickness is from 5 to 1000 μm.

22. The aliphatic polyester film according to claim 11, which is for wrapping or packaging.

23. A package of an object wrapped or packaged with the aliphatic polyester film according to claim 11.

24. The aliphatic polyester film according to claim 4, of which the haze is from 0.05 to 3% when its thickness is 10 μm.

25. The aliphatic polyester film according to claim 4, of which the heat-resistant temperature falls between 100 and 170° C.

26. The aliphatic polyester film according to claim 4, of which the degree of crystallinity is from 10 to 60%.

27. The aliphatic polyester film according to claim 4, of which the thickness is from 5 to 1000 μm.

28. The aliphatic polyester film according to claim 4, which is for wrapping or packaging.

29. A package of an object wrapped or packaged with the aliphatic polyester film according to claim 4.

* * * * *